US009639618B2

(12) United States Patent
Iqbal

(10) Patent No.: US 9,639,618 B2
(45) Date of Patent: May 2, 2017

(54) SYSTEM, METHOD AND PROGRAM PRODUCT FOR KEY WORD SEARCHING WHERE A KEY WORD IS A HOMONYM

(75) Inventor: Mickey Iqbal, Tucker, GA (US)

(73) Assignee: International Business Machines Corporation, Armonk, NY (US)

( * ) Notice: Subject to any disclaimer, the term of this patent is extended or adjusted under 35 U.S.C. 154(b) by 1062 days.

(21) Appl. No.: 11/441,932

(22) Filed: May 25, 2006

(65) Prior Publication Data
US 2007/0276820 A1 Nov. 29, 2007

(51) Int. Cl.
*G06F 17/30* (2006.01)
(52) U.S. Cl.
CPC .. *G06F 17/30873* (2013.01); *G06F 17/30696* (2013.01)
(58) Field of Classification Search
CPC ............................................... G06F 17/30696
USPC ............................................................. 707/736
See application file for complete search history.

(56) References Cited

U.S. PATENT DOCUMENTS

| | | | |
|---|---|---|---|
| 5,794,178 | A | 8/1998 | Caid et al. ................. 704/9 |
| 6,523,028 | B1 | 2/2003 | DiDomizio et al. .............. 707/5 |
| 6,778,193 | B2 | 8/2004 | Biebesheimer et al. ...... 345/805 |
| 2003/0177113 | A1 | 9/2003 | Wakita ............................. 707/3 |
| 2005/0171760 | A1* | 8/2005 | Tinkler ............... G06F 17/2795 704/10 |
| 2005/0222975 | A1* | 10/2005 | Nayak ............... G06F 17/30613 707/3 |

FOREIGN PATENT DOCUMENTS

EP 0 477 152 A2 * 3/1992 ............ G06F 15/40

OTHER PUBLICATIONS

Hernandez et al., "Assisted Navigation in Prompted Query", TDB 11-88 pp. 186-187.
Hunt, GD, "Graphics Query System" TDB 08-87 pp. 1350-1351.
http://www.informatik.uni-trier.de/~ley/db/conf/cikm/DashH95.html.
http://www-db.stanford.edu/tsimmis/.
Norgard, B. (1998). Entry Vocabulary Modules and Agents Technical report.

(Continued)

*Primary Examiner* — Chelcie Daye
(74) *Attorney, Agent, or Firm* — Schmeiser, Olsen & Watts, LLP; Michael A. Petrocelli

(57) ABSTRACT

System, method and program product for forming a search query. A user enters search terms. Icons that correspond to the respective search terms are automatically determined and displayed. The icons are not the search results. An indication is received from a user whether the icons represent a context intended by the search terms. If the user indicates that the icons represent the context intended by the search terms, a search that corresponds to the icons is conducted. The search query can be structured or unstructured. If the user indicates that one of the icons does not represent a corresponding search term entered by the user (for example, if the search term is a homonym), then the context of the corresponding search term is determined as well as another icon corresponding to the context of the corresponding search term entered by the user. A hierarchical relationship between the icons can be determined and displayed.

12 Claims, 4 Drawing Sheets

(56) References Cited

OTHER PUBLICATIONS

Plaunt, C. and B. A. Norgard (1998). An association based method for automatic indexing with a controlled vocabulary. Journal of the American Society for Information Science.
Filip Ginter, Sampo Pyysalo, Jorma Boberg, Jouni] Ontology-Based Feature Transformations: A Data-Driven Approach.

* cited by examiner

SYSTEM, METHOD AND PROGRAM PRODUCT FOR KEY WORD SEARCHING WHERE A KEY WORD IS A HOMONYM

FIELD OF THE INVENTION

The present invention relates generally to computer systems, and more specifically to key word searching of structured and unstructured databases.

BACKGROUND OF THE INVENTION

Key word searching is well known, where a user enters a search query in the form of key words or search terms and Boolean operators, such as "And" or "Or". In response, a search program or search "engine" searches for documents which include the search terms (in the case of unstructured data) or for information in tables that corresponds to the search terms (in the case of structured data). For example, Yahoo Corporation and Google Corporation provide search engines to search unstructured web pages and web files available through the Internet. As another example, Concept Hierarchy Model (CHM) program by Clement Yu et al, and TSIMMIS program by Hector Molina Garcia et al can search structured tables for data corresponding to search terms. Google Corporation also allows key word searches to search images. For example, if a user defines a search query as "house and door", the Google Image Search engine will return as search results images of houses with doors.

Some search terms, known as "homonyms" have different meanings or contexts. Some of these search terms have different meanings globally, i.e. in unstructured documents. For example, the term "bridge" can mean a dental device or a roadway device spanning a river. Other search terms have different meanings within heterogeneous, structured databases. For example, the search term "affiliation" in one structured database as applied to an employee may mean the type of work the employee performs and in another structured database may mean, the employee's employer. Such differences in meaning of search terms in unstructured or structured databases are called "semantic conflicts". There are other types of semantic conflicts, such as differences in structural representations of data, differences in data models, mismatched domains, and different naming and formatting schemes used by the different databases. The database schemas described below illustrate some types of semantic conflicts that can exist in heterogeneous databases. Table 1 is an Oracle database of Engineering Faculty members of Chicago based Universities. Table 2 is a Microsoft SQL Server database of employees of engineering related firms.

TABLE 1

| | |
|---|---|
| Data Model: | Non-Normalized Relational Schema (partial):<br>Faculty (SS#, Name, Dept, Sal_Amt, Sal_Type, Affiliation, Sponsor, University . . . ) |
| Faculty: | Any tuple of the relation Faculty, identified by the key SS# |
| SS#: | An identifier, the social security number of a faculty member |
| Name: | An identifier, Name of a faculty member |
| Dept: | The academic or nonacademic department to which a faculty member is affiliated |
| Sal_Amt: | The amount of annual Salary paid to a Faculty member |
| Sal_Type: | The type of salary such as Base Salary, Grant, and Honorarium |
| Affiliation: | The affiliation of a faculty member, such as teaching, non-teaching, research |
| University: | The University where a Faculty member is employed |

TABLE 2

| | |
|---|---|
| Data Model: | Non-Normalized Relational Schema (partial):<br>Employee (ID, Name, Type, Employer, Dept, CompType, Comp, Affiliation . . . ) |
| Employee: | Any tuple of the relation Employee, identified by the key ID |
| ID: | An identifier, the social security number of an Employee |
| Name: | An identifier, Name of an employee |
| Type: | An attribute describing the job category of an Employee, such as Executive, Middle Manager, Consultant from another firm, etc.. |
| Employer: | Name of the employer firm such as AT&T, Motorola, General Motors, etc. |
| Dept: | Name of the department where an Employee works |
| CompType: | The type of compensation given to an employee, such as Base Salary, Contract Amount |
| Comp: | The amount of annual compensation for an employee |
| Affiliation: | Name of the Consultant firm, such as a University Name, Andersen Consulting, . . . |

There are several semantic correspondences between Table 1 and Table 2, even though some of the class names for the same type of information differ. First, a 'Faculty' class in Table 1 and an 'Employee' class in Table 2 intersect. Instances of attribute 'SS#' in Table 1 correspond to instances of attribute 'ID' in Table 2 where the employees are consultants from Chicago-based Universities. 'Dept' attributes in Table 1 and Table 2 share some common domain values; as do 'Sal_Type' in Table 1 and 'Comp_Type' in Table 2; and 'Sal_Amt' in Table 1 and 'Comp' in Table 2. These three pairs may be considered either as synonyms or homonyms depending on the nature of the query posed against these two databases. 'Affiliation' attributes in Table 1 and Table 2 are homonyms, as are 'University' attribute in Table 1 and 'Employer' attribute in Table 2, because their domains do not overlap. 'University' attribute in Table 1 and 'Affiliation' attribute in Table 2 may be considered as synonyms for the subset of class 'Employee' where 'Employee.Type=Consultant', and where the values in the domain of the attribute 'Affiliation' in Table 2 corresponds to the names of Chicago based Universities. Semantic reconciliation approaches identify and reconcile semantic incompatibilities and distinctions such as those illustrated by the example above. The number of semantic conflicts increases as more heterogeneous data sources need to be searched.

The following techniques are known to map the meaning or context of each query to heterogeneous databases, such that the query yields the desired information from each database despite semantic conflicts between the databases. For example, the following technique can be used to map the search term "class" to the foregoing Oracle and Microsoft databases even though the search term "class" has different meanings within these heterogeneous databases. These techniques attempt to find Inter-Schema Correspondence Assertions ("ISCAs") which correlate the original search term to the search terms or "classes" with the intended context in the heterogeneous databases.

For each term in an original or "local" query, which is being searched in or mapped against a remote database, an integrator program (such as Semantic Coordinator Over Parallel Exploration Spaces "SCOPES") first tries to establish anchors (or correspondences) in the remote database. Each local search query term may have several anchors. For example there can be q terms, denoted by set Tlocal={t1, t2, t3 . . . tq} in a query, and r matching terms, denoted by set Tremote={t'1, t'2, t'3, . . . t'r} in the remote database. Assume that each term in Tlocal maps to each of the r terms in Tremote with some probability (or a similarity value), this forms r anchors for each of the search query terms.

An initial attempt toward reconciling Tlocal against the remote database may include arbitrarily (or randomly) selecting one anchor for each of the terms in Tlocal. For example, let Tlocal={t1, t2, t3} and Tremote={t'1, t'2, t'3, t'4}. Assume that the set of anchors denoted Au={(t'1,t'4), (t2,t'3), (t3,t'2)} is considered initially while interpreting the local query against a remote database. In case the reconciliation fails with this set of anchors, the user may arbitrarily select another set of anchors to continue attempts at reconciliation.

According to the classification proposed in Naiman & Ouksel, (in a document entitled "A Classification of Semantic Conflicts in Heterogeneous Database Systems", published in Journal of Organizational Computing, 5(2), 167-193), there exist twelve possible semantic relationships between any two terms or concepts from different databases. The classification by Naiman & Ouksel allows them to represent each of these twelve cases as an Inter Schema Correspondence Assertion (ISCA). For example let the sets of ISCAs corresponding to anchors (t1,t'4), (t2,t'3), and (t3,t'2) be denoted by sets ISCA(t1, t'4)={a1, a2, . . . a12}, ISCA(t2, t'3)={b1, b2, . . . b12} and ISCA(t3, t'2)={c1, c2, . . . c12} respectively, where all ai, bi and ci (1=<i=<12) denote different inter-schema correspondence assertions from the classification. Each member of the above three sets, ISCA(t1, t'4), ISCA(t2, t'3) and ISCA(t3, t'2), is of the form:

[Assert (x,y), naming, abstraction, heterogeneity], where x corresponds to an element in the local database schema, y corresponds to an element in the remote database schema, naming corresponds to a naming relationship between x and y, abstraction corresponds to an abstraction relationship between x and y, and heterogeneity denotes the relative positioning of x and y in their respective schemas. Without complete semantic knowledge of the remote database, any of the twelve inter-schema correspondence assertions for each anchor may be considered plausible unless refuted by contradictory evidence.

The end user can choose one ISCA each from the sets ISCA(t1, t'4), ISCA(t2, t'3) and ISCA(t3, t'2) such that the resulting set of ISCAs form a consistent (or non-contradictory) and contextual proper interpretation for the query. In the absence of complete knowledge, each combination set resulting from the Cartesian product of sets ISCA(t1, t'4), ISCA(t2, t'3) and ISCA(t3, t'2) represents one plausible set of assertions. For example the combination set {a1, b2, c9} represents a plausible set of assertions. However, not all of these combination sets may be consistent (or non-contradictory) with respect to the assertions contained within the sets. Theoretically, in the worst case scenario the total number of sets of plausible inter-schema correspondence assertions, which result from the Cartesian product can be determined as follows. Let $T_{local}=\{t_1, t_2, \ldots, t_q\}$ and $T_{remote}=\{t'_1, t'_2, \ldots t'_r\}$.

In the worst case scenario, assume that there exist 'r' anchors for each of the terms in set Tlocal. According to the Naiman & Ouksel classification there are twelve possible semantic relationships between any two terms. Therefore the total number of combination sets, which may be examined during reconciliation is: |CombinationSet|=(12r)q, where q is the number of terms in a query and r is the total number of matching terms in a remote database where each one of the q terms can be mapped to each of the r terms in a remote database with some probability (or a similarity value). There are known techniques to reduce the number of possible semantic relationships and interpretations; however, many possibilities still remain. While the foregoing techniques are viable, they are difficult and time consuming because of the many possible semantic relationships and interpretations between any two search terms.

Accordingly, an object of the present invention is to facilitate semantic reconciliation between unstructured documents which are searched by key words or terms.

Another object of the present invention is to facilitate semantic reconciliation between heterogeneous structured databases which are searched by key words or terms.

SUMMARY OF THE INVENTION

The present invention resides in a system, method and program product for forming a search query. A user enters search terms. Icons that correspond to the respective search terms are automatically determined and displayed. The icons are not the search results. An indication is received from a user whether the icons represent a context intended by the search terms. If the user indicates that the icons represent the context intended by the search terms, a search that corresponds to the icons is conducted.

According to a feature of the present invention, the search query can be structured or unstructured.

According to another feature of the present invention, if the user indicates that one of the icons does not represent a corresponding search term entered by the user (for example, if the search term is a homonym), then the context of the corresponding search term can be determined as well as another icon corresponding to the context of the corresponding search term entered by the user.

According to another feature of the present invention, a hierarchical relationship between the icons can be determined and displayed.

DETAILED DESCRIPTION OF THE PREFERRED EMBODIMENTS

Figure 1:
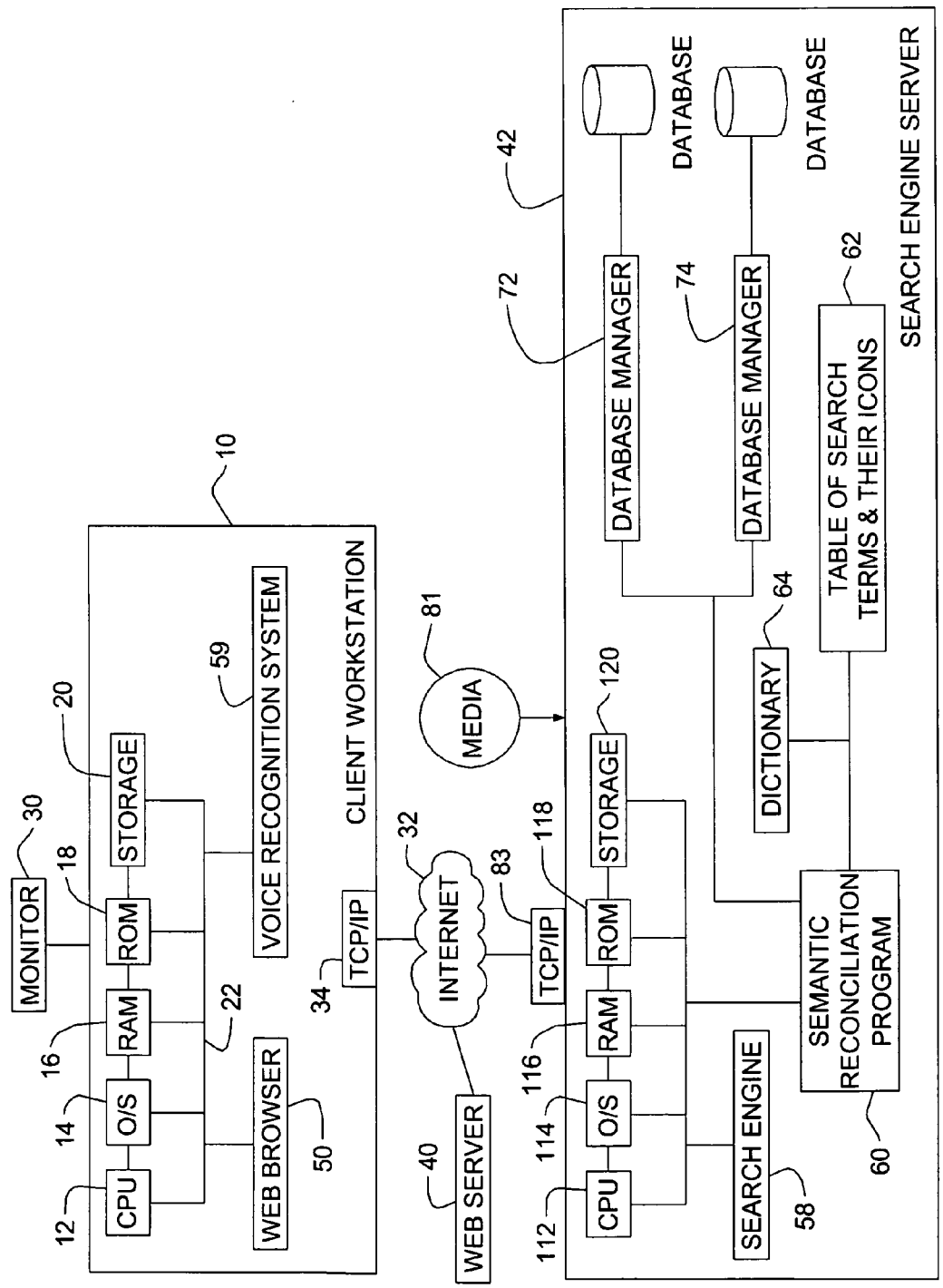
FIG. 1 is a block diagram of a distributed computer system, including a semantic reconciliation program, in which the present invention is incorporated.

The present invention will now be described in detail with reference to the figures. FIG. 1 illustrates a computer 10 in which the present invention is incorporated. Computer 10 includes a CPU 12, operating system 14, RAM 16, ROM 18 and storage 20 on a bus 22, according to the prior art. Computer 10 is also connected to a monitor 30 according to the prior art. Computer 10 is also coupled to the Internet 32 via a TCP/IP card 34, according to the prior art. A multiplicity of web servers including web server 40 and search engine server 42 are also coupled to the Internet 32, according to the prior art.

Search engine server 42 includes a CPU 112, operating system 114, RAM 116, and ROM 118 and storage 120 on a bus 122, according to the prior art. Search engine server 42 also includes a semantic reconciliation program 60, according to the present invention, stored in storage 120 for execution by CPU 112 via RAM 116, to determine icons that represent search terms, and a schematic display of the icons that represents the relationships between the icons. Program 60 also identifies and reconciles homonyms (and other terms) entered by the user as search terms, into the proper context intended by the user. A "homonym" is a word or term that is subject to two different meanings, either based on a natural language (i.e. English, French, Spanish, etc.) in which they are entered or the schema and structure of a structured database to which they will apply as search terms.

Computer 10 also includes a web browser 50 to interface to servers, including web server 40 and search engine server 42, on the Internet, upon request by a user of computer 10. Web browser 50 is stored in storage 20 for execution by CPU 12 via RAM 16. When the user requests to connect to the search engine server 42, the web browser fetches and presents a web page provided by a search engine program 58, to support a key word search or query. This web page includes a field or fields for the user to enter search terms (or "key words"), as well as Boolean operators and other limiters for the search, as known in the prior art. Computer 10 can also include known voice recognition software 59 to allow spoken entry of the search terms and Boolean operators, and identification of the spoken words. Search engine server 42 also includes a natural language processing and syntactical processing program 55 which identifies actual search terms within the spoken words identified by voice recognition software 59, when the spoken words are phrases or sentences.

To being a search, a user enters a search query into computer 10. The search query can be in the form of a typed-in unstructured key word search, a typed-in structured query search, or a spoken search. The web browser 50 forwards the search query to search engine server 42 (after processing by voice recognition software 59 in the case of a spoken search). Program 60 parses the query to identify and classify each of its search terms. If the query is unstructured, the search terms are typically words or terms in a natural language and program 60 identifies these words or terms without classification. If the query is structured, program 60 can parse the query, using the specified structured query language syntax, into the query's objects, attributes and instances. Next, program 60 attempts to match each of the search terms to a respective icon in a table 62. Table 62 identifies search terms which are homonyms, and provides two or more icons for each homonym. For example, if a search term is "bridge", table 62 will identify this term as a homonym and identity an icon 66 for a transportation bridge, an icon 68 for a dental bridge and an icon 70 for a card game. Each icon is a picture of the respective type of bridge. As another example, if the search term for a structured database is "employee", table 62 will identify this term as a homonym, and an icon 74 for a student (for example, an icon of a person reading books in a library, where the person wears a scholar hat to emphasize the icon's meaning), and an icon 76 for a worker (for example, an icon of an image of a person performing work in an office environment). Then, program 60 attempts to determine the proper context of the search term and a proper icon to portray its context based on other terms in the search query that indicate the context. Next, program 60 displays a schematic diagram including all the icons and representing relationships between the icons, to the extent these relationships can be determined. Program 60 determines these relationships based on the form of the search query, as described below. Program 60 also displays the search terms adjacent to the respective icons in the schematic diagram. Next, the user either confirms that the schematic diagram accurately reflects the user's search query, or selects (with a mouse or other device), any icons that do not represent the proper context of the search term intended by the user. In the latter case, program 60 makes another attempt at identifying the proper context of the search terms corresponding to the icons selected by the user as incorrect, and then repeats the foregoing process of displaying the new schematic diagram and waiting for the user to evaluate it.

Once the user has confirmed the schematic diagram representing the user's intended search query, program 60 converts the schematic diagram into search query(ies) corresponding to the semantics of the target database(s). Program 60 can use a known database mapping technique such as the following to find remote matching terms in remote "structured" databases for the end user's query terms. For example, program 60 can use known multidatabase or federated database ontology based approaches, semi-structured information mapping approaches, SCOPES and other similar existing approaches to find remote matching terms. One such approach is the Summary Schema Model (by Bright, Hurson and Pakzad et al). This technique determines the degree of semantic similarities among terms using word relationships as defined in a thesaurus. The scheme stores semantic information related to the access terms in a matrix and uses this information to calculate degrees of similarities between terms. For searching unstructured documents, table 62 also includes for each icon a corresponding term or group of terms that will convey the context or meaning of the icon. In the case of a homonym in an unstructured search, the group of terms may include the user's original homonym and another term that can be added to the homonym to qualify/limit the query. For example, for the transportation bridge icon, the corresponding group of terms can be "car or truck or train or river" in addition to "bridge", for the dental bridge icon, the corresponding group of terms can be "tooth, teeth, denture or dental" in addition to "bridge", and for the card game icon the corresponding term can be "card" in addition to "bridge". In the case of an icon which represents a term in a structured query, for each such icon, table 62 includes the corresponding object, attribute or instance in the language of the database which is to be searched. For example, if the database to be searched uses the term "employee" to mean student, for the student icon program 60 will specify the search term "employee". However, if the database to be searched uses the term "student" to mean a student, for the student icon program 60 will specify the search term "student" for the student icon. Program 60 notifies search engine 58 (in the case of an unstructured web document search) or database managers of respective structured databases of the proper search terms. In response, search engine 58 conducts the search with the proper search terms and returns the results to the user.

In some cases, it is not practical to provide a single icon which portrays a meaning or context of a search term. In such a case, program 60 can provide a hierarchical set of icons to portray the meaning or context of the search term, and allow the user to "drill down" through the hierarchy and select the icon (within the context of the higher level icons in the same hierarchy) which represents the intended meaning or context of the text term, or object, attribute or instance in the database. For example, in order to depict the context of a term "cartridge", which in reality refers to a computer printer cartridge, the icon for a computer printer is shown, and associated with this icon is another icon of a "printer cartridge".

Figure 2A:
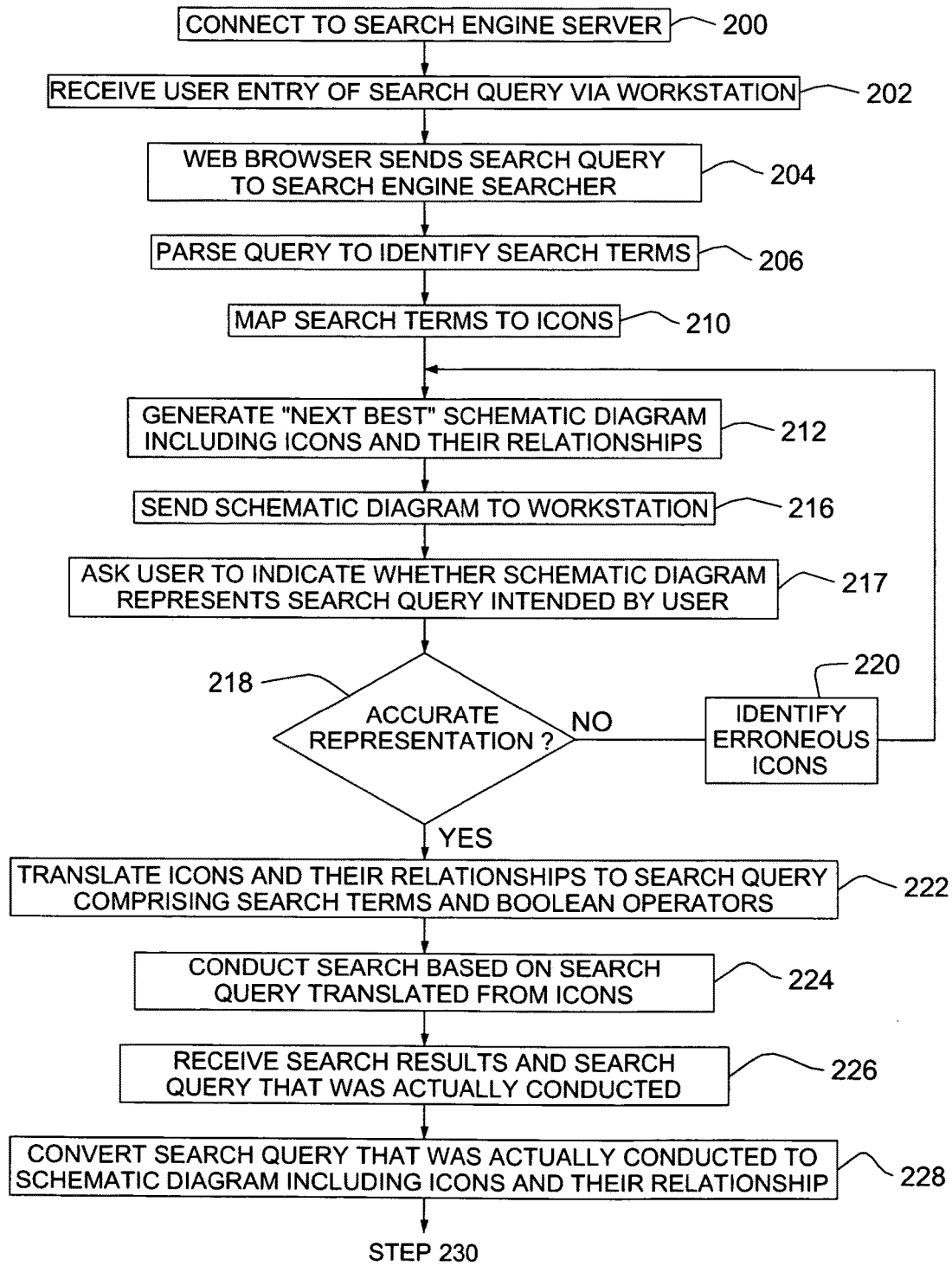
FIGS. 2(A) and 2(B) form a flow chart illustrating the semantic reconciliation program in more detail.
Figure 2B:
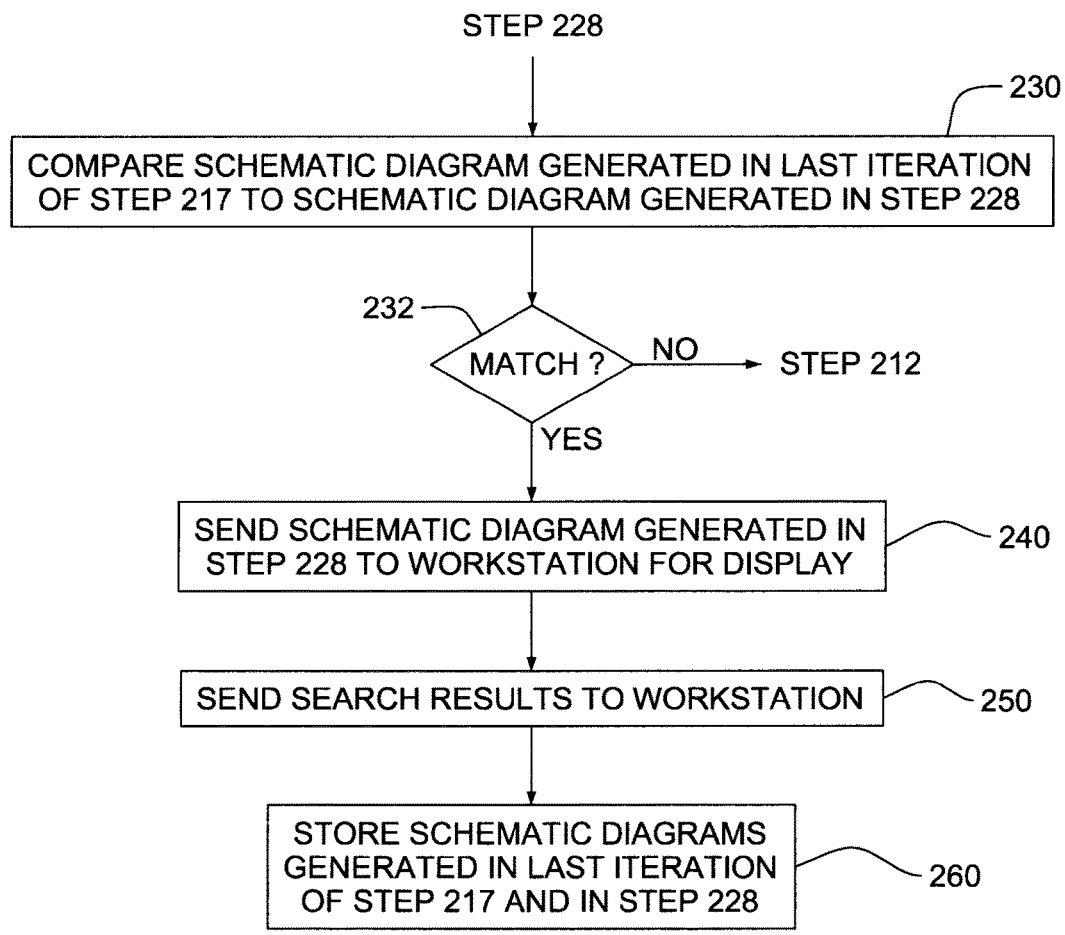

FIGS. 2(A) and 2(B) illustrate program 60 and related processing in more detail. In step 200, a user at computer 10 connects to search engine server 42 using web browser 50. In response, search engine program 58 returns a web page to computer 10. The web page includes a field to enter a search query, and the user enters the search terms of the query (step 202). Web browser 50 sends the query to search engine server 42 (step 204). (If the query was entered by spoken words, then voice recognition software 59 identifies the words that were spoken.) In response to the query, program 60 parses the query to identify the separate terms of the query such as search words or terms in case of a search through unstructured documents (such as web pages or files), or objects, entities, attributes and instances in the case of a structured query for a structured database search (step 206). An "object" typically indicates a table name in a relational database. Also, an "entity" typically indicates a table name in a relational database. An "attribute" typically indicates a characteristic of the object. An "instance" typically indicates one value for an attribute (for example an attribute "color" can have an instance "blue". An example of a structured query for one or more structured databases is select EMPLOYEE.LAST_NAME from EMPLOYEE where EMPLOYEE.LOCATION='Chicago' where EMPLOYEE is the object, EMPLOYEE is ALSO the entity, EMPLOYEE.LAST_NAME AND EMPLOYEE.LOCATION are attributes and Chicago is the instance (to the attribute EMPLOYEE.LOCATION). An example of an unstructured query for unstructured documents is "Bridge and Toll and Philadelphia" (to locate a web-based document which lists the tolls on bridges to Philadelphia). If the user spoke the query in sentence form, then natural language processing and syntactical processing program 55 identifies the actual search terms within those words. The search terms can be unstructured in the case of an unstructured search or structured objects, entities, attributes and/or instances in the case of a structured search. Natural language processing and syntactical processing programs are well known today, such as those described in the following:

[Norgard 1998] Norgard, B. (1998). Entry Vocabulary Modules and Agents Technical report. [HTML]

[Plaunt 1998] Plaunt, C. and B. A. Norgard (1998). An association based method for automatic indexing with a controlled vocabulary. Journal of the American Society for Information Science. [HTML]

[Filip Ginter, Sampo Pyysalo, Jorma Boberg, Jouni] Ontology-Based Feature Transformations: A Data-Driven Approach (http://citeseer.ist.psu.edu/732508.html).

Program 55 can identify the search terms of an unstructured search within the spoken words by using Natural Language Processing techniques such as those mentioned above. Program 55 can identify the objects, entities, attributes and instances of a structured search from the spoken words by also using Natural Language Processing techniques such as those mentioned above. Program 55 can identity the type of search term, i.e. object or entity or attribute or instance, by using Natural Language Processing techniques such as those mentioned above.

Next, program 60 using table 62 attempts to map each search term in the query, whether or not a homonym, to a corresponding icon (step 210). In some cases, there may not be an icon for one of more of the search terms, typically when the search term is not common. Next, program 60 combines the icons into a schematic diagram which graphically indicates the icons and the relationship between the icons (step 212). In the case of an unstructured query, the Boolean operators are displayed between the icons in the schematic diagram. In the case of a structured query, program 60 determines the relationship between the icons and how to illustrate these relationships based on which icons represent objects, which icons represent entities, which icons represent attributes and which icons represent instances (step 212). If one of the search terms is a homonym, program 60 attempts to identify the most likely meaning and respective icon from the icons stored in table 62 for the homonym, and includes the most likely icon in the schematic diagram. (This is the "best" choice diagram during the first iteration of step 212.) Program 60 determines which is the most likely meaning and respective icon by considering all the search terms in the query and the possible definitions of the homonym stored in dictionary database 64, and determining which of the definitions includes the most number of other terms in the query. For example, if one search term is "bridge", the dictionary definition of dental bridge includes the words "dental" or mouth", and another search term is "dental" or "mouth", program 60 will determine from its dictionary that the proper definition of the homonym "bridge" is a "dental device" in this case. Consequently, program 60 will identify the icon for the dental bridge in the schematic diagram. Next, program 60 sends the set of icons in their schematic relationship, and respective search terms (adjacent to the respective icons), to computer 10, so web browser 50 can display the set of icons in their schematic relationship and respective search terms (step 216). The following is an example of step 212 which determines and displays the relationships between icons representing search terms in a structured query (with a predefined query form). In this example, the structured search query is as follows:

Select 'Car' from 'Automobile' where 'Car.Color'='Black'.

In this example, 'Automobile' is the "entity", 'Car' is the "object", 'Color' is the "attribute" and 'Black' is the "instance". Client computer 10 sends this search query to server 42, where it is processed by program 60. Program 60 checks table 62 to determine the icons and relationships that correspond to this search query, and then organizes the icons into a display that illustrates the relationships between the icons, and sends the display as a file to computer 10. If there is no icon for a search term, then program 60 inserts the search term in the schematic diagram in place of the icon.

Figure 3A:
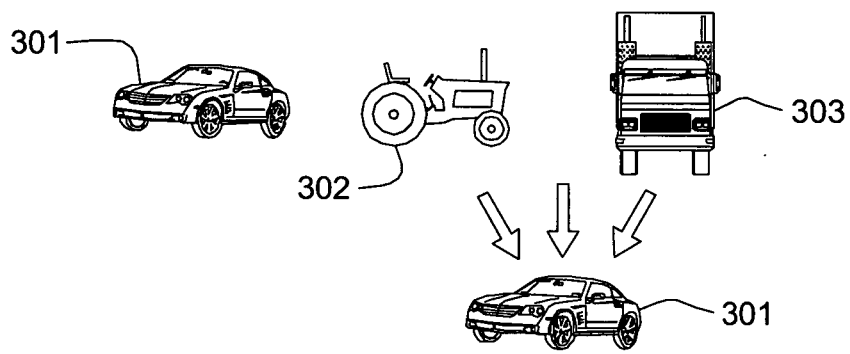
FIGS. 3(A), 3(B) and 3(C) illustrate three graphical representations of a user's search query, generated by the semantic reconciliation program during processing of the search query.

FIG. 3(A) illustrates the result of this structure query example. The first or highest row in the hierarchy are the icons corresponding to the entity 'Automobile'. These include a car icon 301, a pull-tractor icon 302 and a truck icon 303. (The reason that the "entity" term 'Automobile' resulted in icons for a pull-tractor and truck could be a foreign language problem or a broad classification scheme that is used.) The black automobile icon 301 displayed in the second or next row, beneath the arrows, corresponds to the "object" 'Car' and attribute 'Color' with instance 'Black'. Program 60 also defined the arrows in the display to indicate the hierarchical relationship and that car icon 301 in the second row was selected from the icons 301, 302 and 303 in the first row.

Next, web browser 50 prompts the user to indicate whether all of the icons and their schematic representation properly represent the query intended by the user (decision 218). If not (decision 218, no branch), then the user identifies (using the mouse or otherwise), which icons are not proper, and web browser 50 sends the identification of these icons to server 42 (step 220). In response, program 60 determines the next best icons, i.e. which icons should substitute for the ones identified by the user as erroneous (step 212). In this iteration of step 212, these are the icons which are second most likely to match the context of these search terms based on a comparison of the dictionary definitions of the homonym to the other search terms. In step 212, program 60 also determines, in the manner described above, the proper relationship of all the current icons which represent the query (step 212). Steps 212, 218 and 220 are repeated until program 60 identifies the icons which represent the intended meanings of the search terms and their relationships, and the user confirms this.

After identifying the proper icons and their relationships (decision 218, yes branch), program 60 translates the icons and their relationships to a clear and contextually-proper query of search terms (step 222). This search query will be structured or unstructured as was the original search query posed by the user. If the original query included a homonym, program 60 converts the icon which represents the proper context of the homonym into the search term with the proper context. (The icon should already represent the proper context of the homonym.) If the search is for unstructured web pages or other files, then program 60 will typically add one or more search terms to the original query to add the proper context to the homonym. For example, if the proper context of "bridge" is dental, then program 60 will add "dental or tooth or mouth" to the original search term "bridge". Alternately, program 60 can use a known "wrapper" technique to convert each of the unstructured web pages or documents being searched into a structured format, and reformat the original unstructured search into a structured search. In order to access information from a variety of heterogeneous information sources, queries and data are translated from one data model into another. This functionality is provided by so-called (source) wrappers which convert queries into one or more commands/queries understandable by the underlying source and transform the native results into a format understood by the application. As part of the TSIMMIS project, Hector Garcia Molina et al have developed hard-coded wrappers for a variety of sources (e.g., Sybase DBMS, WWW pages, etc.) including legacy systems (Folio). The wrappers implement specific access details of the source and include query and data transformations that are common among wrappers. The TSIMMIS team has developed a wrapper implementation tool kit for quickly building wrappers. If the search is for a structured database, program 60 translates the icon for the homonym to the search term with the same meaning and context in the structured database to be searched. Next, in the case of an unstructured search, program 60 sends the query to the search engine 58 (although the search engine could alternately reside in another server) to search through web pages and files that have been indexed in a known manner. In the case of a structured search query, program 60 sends the query generated in step 222 to each database manager 72 and 74 (although the database managers could alternately reside in different servers) to conduct the search (step 224). Each database manager returns not only the search results, but also the structured query search, consistent with the respective database, that the database manager actually used in its search (step 226). In some cases, the database manager 72 or 74 will alter the search query sent by program 60 to better conform to its database. For example, the database manager 72 or 74 may use different terms in its classification system. As another example, program 60 may not have the latest updates to the form of the database, and may send a search term that does not apply to the current form of the database. Next, program 60 translates the structured query returned by the database manager generated in step 226 into another schematic representation of icons for each database that is searched (step 228). Program 60 makes this translation based on its knowledge of the context of the search terms used in the respective database. The context for each search term is stored in table 62. Usually but not always, the schematic representation generated in step 228 is the same as that generated in the last iteration of step 218. However, as noted above, occasionally the database manager 72 or 74 will not implement the structured query generated in step 222 and sent by program 60. So, step 228 is a check that the search intended by the user, i.e. the search reflected in the schematic diagram accepted by the user in the last iteration of step 218 was in fact applied in the actual search of the unstructured documents or structured databases. Next, program 60 checks if the schematic diagram generated in the last iteration of step 217 matches the schematic diagram generated in step 228 (step 230 and decision 232).

Figure 3B:
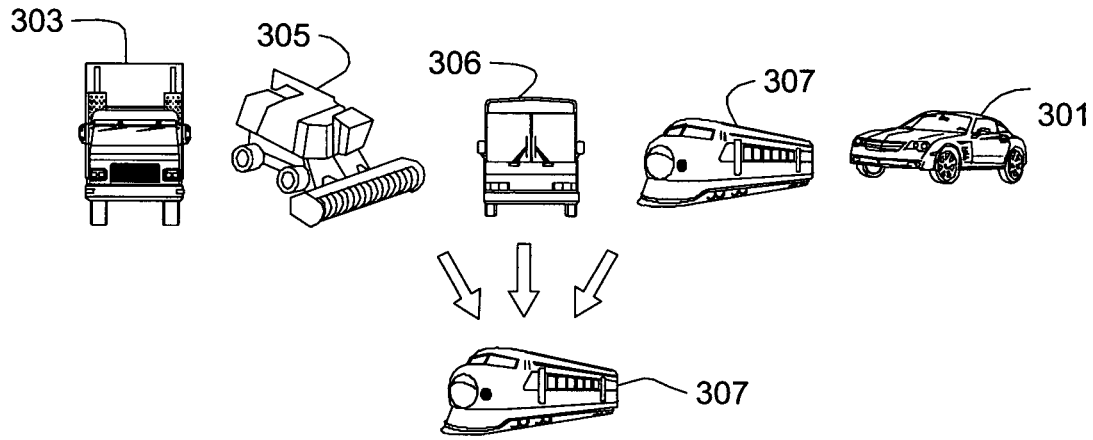

FIG. 3(B) illustrates an example where the search query formed by database manager 72 or 74 and resultant graphical representation formed by program 60 do not match the search query initially formed by the user at client computer 10 and the initial graphical representation formed by program 60 as illustrated in FIG. 3(A). According to database manager 72 or 74, the 'entity' of "Automobile" corresponds to a truck, harvester-tractor, bus, train and car, and program 60 will notify client computer 10 to display these in the first or highest row as truck icon 303, harvester-tractor icon 305, bus icon 306, train icon 307 and car con 301. According to database manager 72 or 74, the 'Object' of "Car" with 'Attribute' of "Black" corresponds to a black train, and as a result, program 60 will notify client computer 10 that the black train icon 307 should be displayed in the second or next row, beneath the arrows. After program 60 sends the file defining the display of FIG. 3(B) to client computer 10, and web browser 50 displays FIG. 3(B), the user has an opportunity to accept or reject the display as a representation of the user's original search query.

Figure 3C:
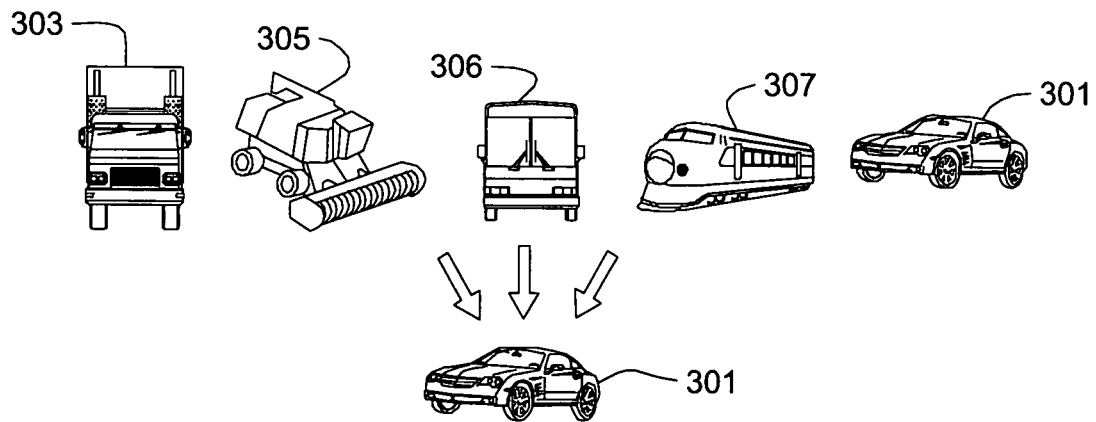

If the user at client computer 10 rejects the display and so notifies program 60 by selection of a rejection command, then program 60 loops back to step 212 to generate the next best schematic representation of icons and their relationships. In the example illustrated in FIG. 3(B), the user will likely reject the display because it does not correspond to the context of the user's original search query. So, after program 60 loops back to step 212 to generate the next best schematic representation and sends it to database manager 72 or 74, assume that the database manager 72 or 74 now properly recognizes the search query and corresponding icons. In such a case, as illustrated in FIG. 3(C), database manager 72 or 74 will return as the 'Entity' of "Automobile" the search terms for a truck, harvester-tractor, bus, train and car, and program 60 will notify client computer 10 to display truck icon 303, harvester-tractor icon 305, bus icon 306, train icon 307 and car icon 301 in the first or highest row. Database manager 72 or 74 will also return as the "Object" of "Car" with 'Attribute' of "Black", so program 60 will notify client computer 10 to display the black car icon 301 in the second or next row. The user should accept this graphical representation of the search query because it represents the context intended by the user; the icon which is singled out in the second row of FIG. 3(C) is that same as that of the second row in FIG. 3(A), even though the icons displayed in the first row of FIG. 3(C) differ from those displayed in the first row of FIG. 3(A).

Assuming there is now a sufficient match between the two schematic diagrams, i.e. the one originally generated by program 60 based on its table 62 and the one generated by program 60 based on the translated search terms returned by database manager 72 or 74 (decision 230, yes branch), then program 60 sends to the client machine for display the combined schematic representation generated in step 228 next to the schematic representation generated in the last iteration of step 217 (step 240). Next, program 60 obtains the search results form database manager 72 or 74, and sends the search results of the search to the user (step 250). Also, program 60 stores the schematic representations generated in the last iteration of step 217 and step 228, for future use, if the user repeats the same query (step 260).

Program 60 can be loaded into server 42 from a computer-readable storage device 81 such as magnetic tape or disk, CD ROM, DVD etc. or downloaded from the Internet via TCP/IP card 83.

Programs 55 and 58 can also be loaded into server 42 from computer-readable storage device 81 or downloaded from the Internet via TCP/IP card 83.

The term "computer-readable storage device" does not include a signal propagation media such as a copper transmission cable, an optical transmission fiber or a wireless transmission media.

Based on the foregoing, system, method and program product for clarifying and conducting a search have been disclosed. However, numerous modifications and substitutions can be made without deviating from the scope of the present invention. For example, this system can be coupled with an existing semantic reconciliation technique such as CHM, SSM, SCOPES or TSIMMIS which are referenced above to provide more efficient semantic reconciliation. Therefore, the present invention has been disclosed by way of illustration and not limitation, and reference should be made to the following claims to determine the scope of the present invention.

What is claimed:

1. A method for forming a search query, the method comprising the steps of:
   a computer receiving entry by a user of a plurality of key-word search terms for a key-word search, wherein one key-word search term of the plurality of key-word search terms is a homonym that has two different but correct meanings in two respective different contexts;
   the computer automatically determining that one but not the other of the different meanings is intended by the user based at least in part on another key-word search term of the plurality of key-word search terms being a common adjective for the one different meaning but not the other different meaning of the homonym;
   the computer selecting one icon of two icons from computer memory to represent the intended meaning of the homonym as determined by the computer, the two icons representing the two respective different meanings of the homonym;
   the computer displaying a first row of unique icons pertaining to an entity associated with the search query, each unique icon representing a respective unique object of the entity;
   the computer receiving notification that a single unique object represented by a single icon of the unique icons in the first row is modified by a specific attribute and in response, the computer displaying (i) a second row consisting of the single icon modified by the specific attribute and (ii) a plurality of arrows pointing from the first row to the second row, said second row being displayed beneath the first row and simultaneously with both the first row and the plurality of arrows;
   the computer receiving acceptance from the user of the displayed single icon modified by the specific attribute for inclusion in the search query of the single unique object modified by the specific attribute;
   the computer displaying the one icon, the single icon and other icons representing meanings of the other respective key-word search terms; and
   the computer querying the user whether the displayed icons correctly represent the key-word search as intended by the user, and if so, the computer initiating an electronic, key-word search based on meanings of the displayed icons.

2. A method as set forth in claim 1 wherein the electronic search is conducted through an unstructured database.

3. A method as set forth in claim 1 wherein:
   the step of the computer initiating the electronic key-word search comprises the steps of the computer requesting a database manager to search through a structured database with search terms based on the meanings of the displayed icons, and in response, the database manager changing one of the search terms which was based on the meanings of the displayed icons to conform to a structure of the structured database, and conducting the electronic search through the structured database with the changed search term; and further comprising the steps of:
   subsequent to the step of the database manager conducting the electronic search through the structured database with the changed search term, the computer automatically generating a graphical representation of a search query used by the database manager to conduct the electronic search through the structured database with the changed search term; and
   the computer automatically determining if the graphical representation of the search query used by the database manager to conduct the search through the structured database with the changed term complies with meanings, intended by the user, of the displayed key-word search terms.

4. The method of claim 3 further comprising the steps of:
   subsequent to the step of the database manager conducting the electronic search through the structured database with the changed search term, the computer automatically generating a graphical representation of a search query used by the database manager to conduct the electronic search through the structured database with the changed search term; and
   the computer automatically determining if the graphical representation of the search query used by the database manager to conduct the search through the structured database with the changed term complies with meanings, intended by the user, of the displayed key-word search terms.

5. A computer program product for forming a search query, the computer program product comprising:
   one or more computer-readable hardware storage devices and program instructions, stored on the one or more storage devices, the program instructions being executable by a computer processor, the program instructions comprising:
   program instructions to receive entry by a user of a plurality of key-word search terms for a key-word search, wherein one key-word search term of the plurality of key-word search terms is a homonym that has two different but correct meanings in two respective different contexts;
   program instructions to automatically determine that one but not the other of the different meanings is intended by the user based at least in part on another key-word search term of the plurality of key-word search terms being a common adjective for the one different meaning but not the other different meaning of the homonym;

program instructions to select one icon of two icons from computer memory to represent the intended meaning of the homonym as determined by the computer, the two icons representing the two respective different meanings of the homonym;

program instructions to display a first row of unique icons pertaining to an entity associated with the search query, each unique icon representing a respective unique object of the entity;

program instructions to receive notification that a single unique object represented by a single icon of the unique icons in the first row is modified by a specific attribute and in response, display (i) a second row consisting of the single icon modified by the specific attribute and (ii) a plurality of arrows pointing from the first row to the second row, said second row being displayed beneath the first row and simultaneously with both the first row and the plurality of arrows;

program instructions to receive acceptance from the user of the displayed single icon modified by the specific attribute for inclusion in the search query of the single unique object modified by the specific attribute;

program instructions to display the one icon, the single icon and other icons representing meanings of the other respective key-word search terms; and program instructions to query the user whether the displayed icons correctly represent the key-word search as intended by the user, and if so, initiate an electronic, key-word search based on meanings of the displayed icons.

6. The computer program product of claim 5 wherein the electronic search is conducted through an unstructured database.

7. The computer program product of claim 5 further comprising a database manager program stored on a computer-readable storage device, and wherein:

the program instructions to initiate the electronic keyword search comprises program instructions to request the database manager program to search through a structured database with search terms based on the meanings of the displayed icons, and in response, the database manager program changing one of the search terms which was based on the meanings of the displayed icons to conform to a structure of the structured database, and conducting the electronic search through the structured database with the changed search term; and program instructions, responsive to the database manager conducting the electronic search through the structured database with the changed search term, to generate a graphical representation of a search query used by the database manager to conduct the electronic search through the structured database with the changed search term; and program instructions to determine if the graphical representation of the search query used by the database manager to conduct the search through the structured database with the changed term complies with meanings, intended by the user, of the displayed key-word search terms.

8. The computer program product of claim 5 further comprising:

program instructions, stored on the one or more storage devices, responsive to the database manager program conducting the electronic search through the structured database with the changed search term, to generate a graphical representation of a search query used by the database manager to conduct the electronic search through the structured database with the changed search term; and program instructions, stored on the one or more storage devices, to determine if the graphical representation of the search query used by the database manager to conduct the search through the structured database with the changed term complies with meanings, intended by the user, of the displayed key-word search terms.

9. A computer program product for forming a search query, the computer program product comprising:

one or more computer-readable hardware storage devices and program instructions, stored on the one or more storage devices, the program instructions being executable by a computer processor, the program instructions comprising:

program instructions to receive entry by a user of a plurality of key-word search terms for a key-word search, wherein one key-word search term of the plurality of key-word search terms is a homonym that has two different but correct meanings in two respective different contexts;

program instructions to automatically determine that one but not the other of the different meanings is intended by the user based at least in part on another key-word search term of the plurality of key-word search terms being associated in a dictionary with the one different meaning but not the other different meaning of the homonym;

program instructions to select one icon of two icons from computer memory to represent the intended meaning of the homonym as determined by the computer, the two icons representing the two respective different meanings of the homonym;

program instructions to display a first row of unique icons pertaining to an entity associated with the search query, each unique icon representing a respective unique object of the entity;

program instructions to receive notification that a single unique object represented by a single icon of the unique icons in the first row is modified by a specific attribute and in response, display (i) a second row consisting of the single icon modified by the specific attribute and (ii) a plurality of arrows pointing from the first row to the second row, said second row being displayed beneath the first row and simultaneously with both the first row and the plurality of arrows;

program instructions to receive acceptance from the user of the displayed single icon modified by the specific attribute for inclusion in the search query of the single unique object modified by the specific attribute;

program instructions to display the one icon, the single icon and other icons representing meanings of the other respective key-word search terms; and program instructions to query the user whether the displayed icons correctly represent the key-word search as intended by the user, and if so, initiate an electronic, key-word search based on meanings of the displayed icons.

10. The computer program product of claim 9 wherein the electronic search is conducted through an unstructured database.

11. The computer program product of claim 9 further comprising a database manager program stored on a computer-readable storage device, and wherein:

the program instructions to initiate the electronic key-word search comprises program instructions to request the database manager program to search through a structured database with search terms based on the meanings of the displayed icons, and in response, the database manager program changing one of the search terms which was based on the meanings of the displayed icons to conform to a structure of the structured database, and conducting the electronic search through the structured database with the changed search term; and program instructions, responsive to the database manager conducting the electronic search through the structured database with the changed search term, to generate a graphical representation of a search query used by the database manager to conduct the electronic search through the structured database with the changed search term; and program instructions to determine if the graphical representation of the search query used by the database manager to conduct the search through the structured database with the changed term complies with meanings, intended by the user, of the displayed key-word search terms.

12. The computer program product of claim 9 further comprising:

program instructions, stored on the one or more storage devices, responsive to the database manager program conducting the electronic search through the structured database with the changed search term, to generate a graphical representation of a search query used by the database manager to conduct the electronic search through the structured database with the changed search term; and program instructions, stored on the one or more storage devices, to determine if the graphical representation of the search query used by the database manager to conduct the search through the structured database with the changed term complies with meanings, intended by the user, of the displayed key-word search terms.

\* \* \* \* \*